(12) United States Patent
Deng et al.

(10) Patent No.: US 11,998,844 B2
(45) Date of Patent: Jun. 4, 2024

(54) INFORMATION PROCESSING METHOD AND APPARATUS, STORAGE MEDIUM, ELECTRONIC DEVICE

(71) Applicant: NETEASE (HANGZHOU) NETWORK CO.,LTD., Hangzhou (CN)

(72) Inventors: Yu Deng, Hangzhou (CN); Hanxiao Li, Hangzhou (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 408 days.

(21) Appl. No.: 16/652,662

(22) PCT Filed: Jul. 25, 2019

(86) PCT No.: PCT/CN2019/097734
§ 371 (c)(1),
(2) Date: Apr. 29, 2021

(87) PCT Pub. No.: WO2020/134059
PCT Pub. Date: Jul. 2, 2020

(65) Prior Publication Data
US 2023/0218997 A1 Jul. 13, 2023

(30) Foreign Application Priority Data

Dec. 26, 2018 (CN) .......................... 201811605513.X

(51) Int. Cl.
*A63F 13/537* (2014.01)
*A63F 13/2145* (2014.01)
*A63F 13/52* (2014.01)

(52) U.S. Cl.
CPC ........ *A63F 13/537* (2014.09); *A63F 13/2145* (2014.09); *A63F 13/52* (2014.09)

(58) Field of Classification Search
CPC .... A63F 13/537; A63F 13/2145; A63F 13/52; A63F 13/822; A63F 13/426; A63F 13/5375
(Continued)

(56) References Cited

U.S. PATENT DOCUMENTS

2018/0311582 A1\* 11/2018 Gerhard ................ A63F 13/426
2022/0152496 A1\* 5/2022 Liu .......................... A63F 13/35
(Continued)

FOREIGN PATENT DOCUMENTS

| CN | 106730810 A | 5/2017 |
| CN | 107050863 A | 8/2017 |

(Continued)

OTHER PUBLICATIONS

The ISR issued Oct. 25, 2019 by the WIPO.
(Continued)

*Primary Examiner* — Pierre E Elisca
(74) *Attorney, Agent, or Firm* — Qinghong Xu

(57) ABSTRACT

The present disclosure provides an information processing method, and apparatus, storage medium, electronic device, which relate to the field of human-computer interaction technology. The method includes: providing a switching control on a graphical user interface; acquiring a type of a virtual object, when it is detected that a crosshair is located on the virtual object; determining whether the first virtual tool equipped by the game character matches the type of the virtual object, according to the type of the virtual object; if the first virtual tool equipped by the game character does not match the type of the virtual object, acquiring a second virtual tool that matches the virtual object according to the type of the virtual object, and setting the second virtual tool as a to-be-switched target of the switching control; and replacing the first virtual tool equipped by the game char- (Continued)

acter with the second virtual tool, in response to a first touch operation of the switching control.

20 Claims, 11 Drawing Sheets

(58) Field of Classification Search
    USPC .......................................................... 463/31
    See application file for complete search history.

(56) References Cited

U.S. PATENT DOCUMENTS

| 2022/0155953 A1* | 5/2022 | Yang | G06F 3/0481 |
| 2022/0379208 A1* | 12/2022 | Mei | G06T 13/20 |

FOREIGN PATENT DOCUMENTS

| CN | 107678647 A | 2/2018 |
| CN | 108159696 A | 6/2018 |
| CN | 108245892 A | 7/2018 |
| CN | 108355353 A | 8/2018 |
| CN | 108837506 A | 11/2018 |
| CN | 109078326 A | 12/2018 |
| CN | 109701274 A | 5/2019 |
| JP | 2015186606 A | 10/2015 |
| JP | 5879007 B1 | 3/2016 |
| JP | 6298866 B1 | 3/2018 |
| JP | 2018518997 A | 7/2018 |
| JP | 6614381 B1 | 12/2019 |

OTHER PUBLICATIONS

The CN1OA issued Aug. 30, 2019 by the CNIPA.
1st Office Action dated Jul. 20, 2021 for JP patent application No. 2020-526248.

* cited by examiner

INFORMATION PROCESSING METHOD AND APPARATUS, STORAGE MEDIUM, ELECTRONIC DEVICE

CROSS-REFERENCE TO RELATED APPLICATIONS

The present application claims priority to Chinese Patent Application No. 201811605513.X, filed with the Chinese Patent Office on Dec. 26, 2018, entitled 'Information Processing Method and Apparatus, Storage Medium, Electronic Device', entirety of which is incorporated herein by reference.

TECHNICAL FIELD

The present disclosure relates to the field of human-computer interaction technology, and in particular, to an information processing method and an apparatus, a storage medium, and an electronic device thereof.

BACKGROUND

In survival games of mobile terminal, collecting resources and making tools and weapons are parts of core experiences in the survival games, and a procedure of collecting and making takes a long time and becomes complex as the game goes on. In addition, functional differences between kinds of tools used for collecting and kinds of weapons used for attacking is a basic setting based on the simulation of real world, and different resources correspond to different collecting tools, such as quarrying with pickaxes and logging with axes, and so on. In survival games, repeatedly switching experiences among different collecting tools is a basic experience operation. Due to the relatively high degree of freedom of the survival games, the game character controlled by the player may encounter various situations in the scene at any time, for example, an enemy or a beast may suddenly come into the sight. At this time, if the tool currently used by the game character is a collecting tool, the player has to choose and switch to an attacking weapon in the backpack or tool list in this emergency state. Such an operation will take too much of the player's time, and put the player at a disadvantage in battle, affecting the player's gaming experience.

Therefore, it is necessary to provide a new information processing method to improve the user's gaming experience.

It should be noted that the information disclosed in the background section above is merely for enhancement of understanding of the background of the present disclosure, and thus may include information that does not constitute prior art known to one of ordinary skill in the art.

SUMMARY

According to an aspect of the present disclosure, there is provided an information processing method, which is applied on a game application executed on a mobile terminal, by rendering and generating a graphical user interface (GUI) on the touch-control screen of the mobile terminal, wherein the graphical user interface at least includes a part of a game scene, at least one virtual object, a game character, a crosshair, and an execution control, the crosshair is used to aim at the virtual object in the game scene, and the execution control is used to control the game character to perform corresponding game operation on the virtual object, the method includes:

providing a switching control on the graphical user interface;

acquiring a type of the virtual object, when it is detected that the crosshair is located on the virtual object;

determining whether the first virtual tool equipped by the game character matches the type of the virtual object according to the type of the virtual object;

if the first virtual tool equipped by the game character does not match the type of the virtual object, acquiring a second virtual tool matching the virtual object according to the type of the virtual object, and setting the second virtual tool as a to-be-switched target of the switching control; and switching the first virtual tool equipped by the game character to the second virtual tool, in response to a first touch operation of the switching control.

According to an aspect of the present disclosure, there is provided an information processing apparatus, which is applied on a game application executed on a mobile terminal, by rendering and generating a graphical user interface (GUI) on the touch-control screen of the mobile terminal, wherein the graphical user interface at least includes a part of a game scene, at least one virtual object, a game character, a crosshair, and an execution control, the crosshair is used to aim at the virtual object in the game scene and the execution control is used to control the game character to perform corresponding game operation on the virtual object, the apparatus includes:

a providing module configured to provide a switching control on the graphical user interface;

a detecting and acquiring module configured to acquire a type of the virtual object, when it is detected that the crosshair is located on the virtual object;

a determining module configured to determine whether the first virtual tool equipped by the game character matches the type of the virtual object according to the type of the virtual object;

a setting module configured to acquire a second virtual tool matching the virtual object according to the type of the virtual object and set the second virtual tool as a to-be-switched target of the switching control, when the first virtual tool equipped by the game character does not match the type of the virtual object; and a switching module configured to switch the first virtual tool equipped by the game character to the second virtual tool, in response to a first touch operation of the switching control.

According to an aspect of the present disclosure, there is provided a computer-readable storage medium on which computer program is stored, and the computer program, when executed by a processor, implements any one of the above-mentioned information processing methods.

According to an aspect of the present disclosure, there is provided an electronic device, which includes:

a processor; and a memory for storing executable instructions of the processor;

wherein, the processor is configured to perform any one of the above-mention information processing methods via executing the executable instruction.

It should be understood that, the above general description and the following detailed description are merely illustrative and explanatory and cannot be construed as a limit to the present disclosure.

BRIEF DESCRIPTION OF THE DRAWINGS

The above and other features and advantages of the present disclosure will become more apparent through the detailed description of exemplary embodiments thereof with reference to the accompanying drawings. It is apparent that the drawings in the following description are only some embodiments of the present disclosure, from which, other drawings may be acquired by those ordinary skilled in the art without paying any creative labor. In the drawings.

DETAILED DESCRIPTION

Figure 1A:
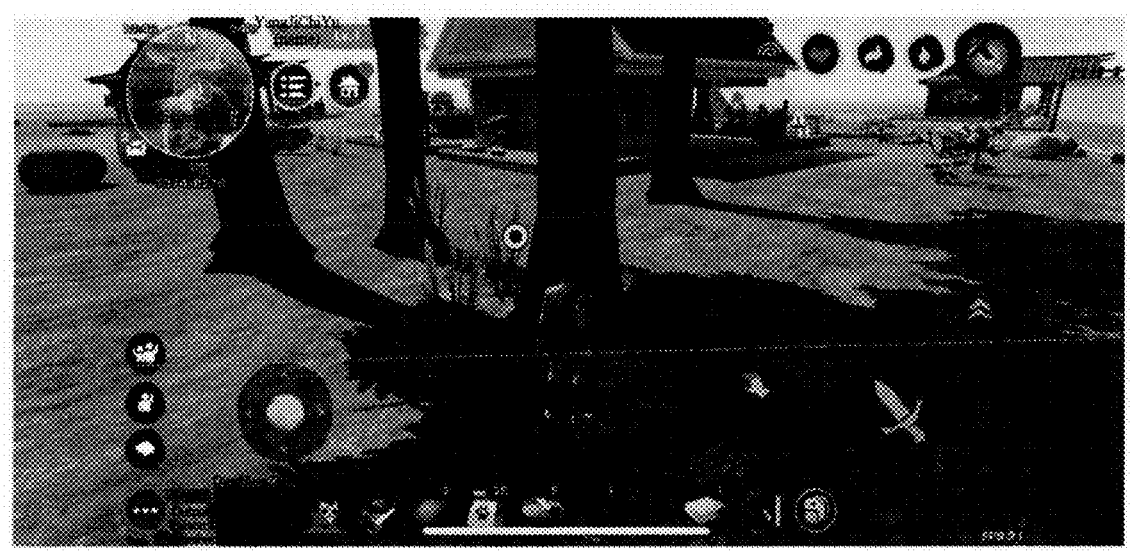
FIG. 1A is a schematic diagram of a graphical user interface of the related art.

Exemplary embodiments will now be described more fully with reference to the accompanying drawings. However, the exemplary embodiments may be embodied in many forms and should not be construed as limited to embodiments set forth herein; rather, these embodiments are provided so that this disclosure will be thorough and complete, and will fully convey the concept of the exemplary embodiments to those skilled in the art. The same reference numerals in the drawings represent the same or similar parts, so the repeated description thereof will be omitted.

Furthermore, the described features, structures, or characteristics may be combined in any suitable manner in one or more embodiments. In the following description, numerous specific details are given to provide a thorough understanding of embodiments of the present disclosure. Those skilled in the art will realize that the technical solutions of the present disclosure may be practiced without one or more of the specific details, or other methods, components, materials, apparatus, steps, etc. may be utilized. In other instances, well-known structures, methods, apparatus, implementations, materials or operations are not shown or described in detail to avoid obscuring respective aspects of the present disclosure.

The block diagrams shown in the accompanying drawings are merely functional entities and do not necessarily correspond to physically separate entities. That is to say, these functional entities may be implemented in software form, or all or part of these functional entities may be implemented in one or more software hardened modules, or these functional entities may be implemented in different networks and/or processor devices and/or microcontroller devices.

Figure 1B:
FIG. 1B is a schematic diagram of another graphical user interface of the related art.
Figure 1C:
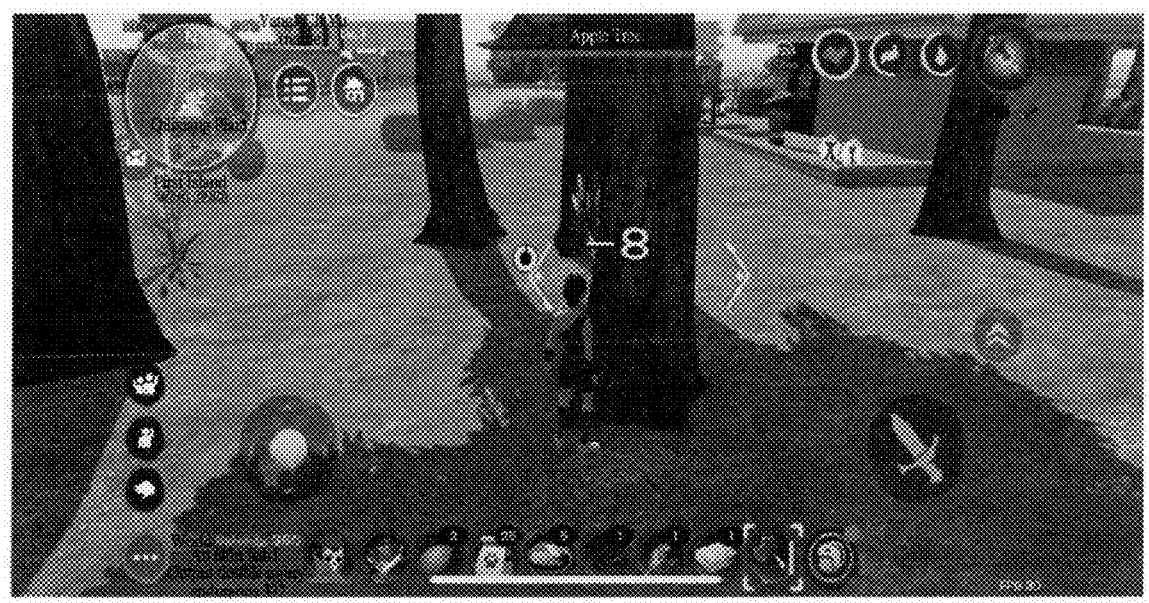
FIG. 1C is a schematic diagram of still another graphical user interface of the related art.
Figure 2:
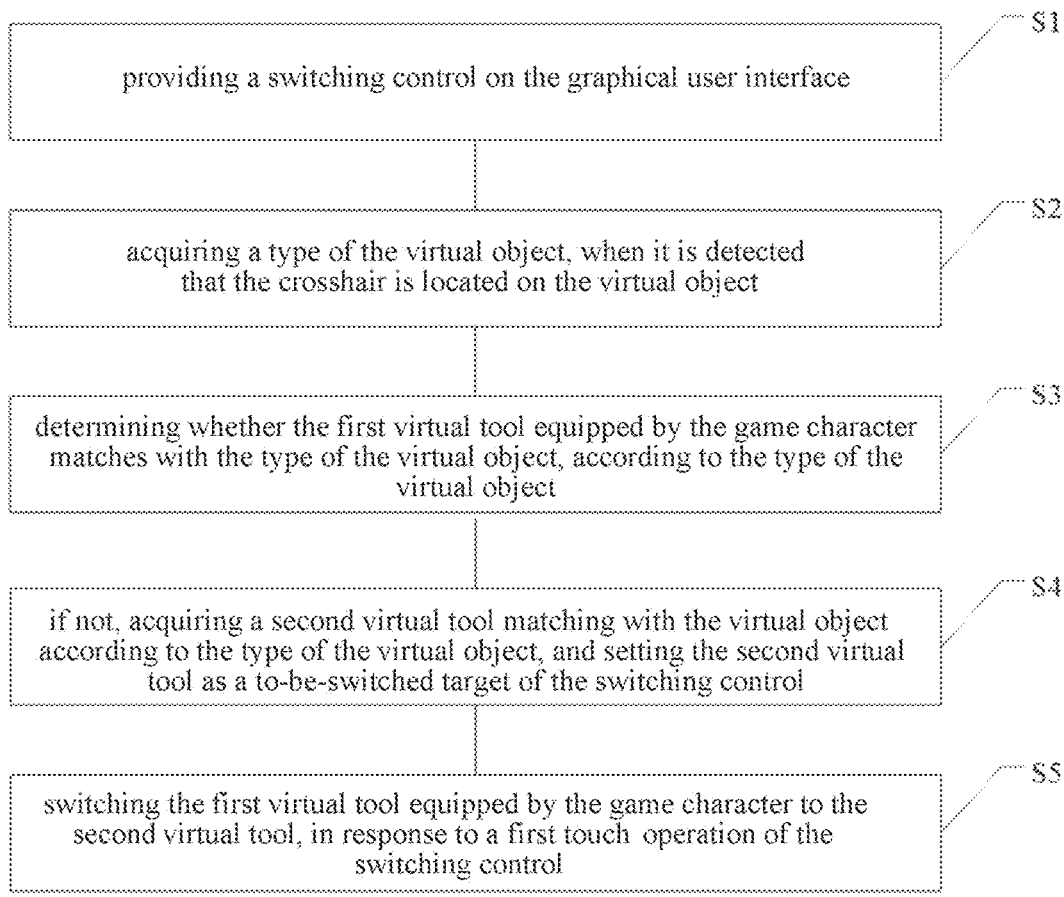
FIG. 2 is a flowchart of an information processing method in an exemplary embodiment of the present disclosure.

In related art, for example, when collecting resources in the sandbox survival game "Creation and Magic" shown in FIGS. 1A to 1C, firstly placing a plurality of collecting tools in shortcut bar arranged on the bottom of the graphical user interface, clicking corresponding tools to complete equipping operations, and then aiming at the resources (for example, trees) in the game scene and clicking attacking buttons on the interface to complete collecting and acquire resource props.

In addition, in the current survival games, another conventional setting scheme is to set a tool control on GUIs. In response to the clicking of the tool control, a control list is displayed. The control list comprises a plurality of tools in player's backpack that may be selected and equipped, but a fully expanded state of the control list will cover a large area of interface, which makes the player cannot timely acquire the dynamic changes of the respective part of the game scene. However, if the control list is presented as a state of partly folded, the player has to carefully identify respective tools in the list and slides a slider bar on the list to complete the selection of proper tools, which makes the game operation inefficient and consumes a lot of time, bringing players poor gaming experience.

Although several game operations and methods are provided in the games in related art, the following defects still exist:

1. The shortcut equipment bar at the bottom of GUI or tool list occupies a large space of the main interface;
2. When collecting different types of resources, the player has to select tools corresponding to the resource from the shortcut bar at the bottom of GUI each time, so as to conduct collection operation;
3. Increase the player's burden of choice. Since the shortcut bar at the bottom of GUI comprises various items and tools, the player has to identify the collecting tools and memorize the specific location of these tools in such bar; and
4. Increase the player's burden of operation. On the one hand, the player has to switch frequently when collecting different types of resources, thereby increasing the player's burden of operation. On the other hand, if the player is attacked during the collection operation and the collection operation is interrupted, the player has to select a proper weapon from the shortcut bar at the bottom of GUI and then perform an attacking operation on the attacking object. These three operations will consume a lot of time of the player, and greatly affect the player's gaming experience.

In view of the above-mentioned defects in the related art, an information processing method is disclosed in this exemplary embodiment at first, which is applied on a game application executed on a mobile terminal, by rendering and generating a graphical user interface on the touch-control screen of the mobile terminal. The graphical user interface at least includes a part of the game scene, at least one virtual object, a game character, a crosshair, and an execution control, and the crosshair is used to aim at the virtual object in the game scene, and the execution control is used to control the game character to perform corresponding game operation on the virtual object. The touch-control terminal may be, for example, various electronic devices with touch-control screens, such as mobile phones, tablet computers, notebook computers, game consoles, and PDAs. The game application may control the touch-control screen of the touch-control terminal to present the virtual object and the virtual joystick area including the virtual joystick, the virtual battle scene, and the virtual natural environment through the application program interface of the touch-control terminal. The interactive interface may be the entire area of the touch-control screen or a partial area of the touch-control screen, which is not particularly limited in this exemplary embodiment. The virtual object, which refers to the game character controlled by the user, is displayed on an interactive interface in the form of a part or the whole of the game character. For example, in a first-person perspective, the content of the interactive interface is presented from the user's master perspective, which enhances user's immersive experience. In this perspective, only a part of the game character may be presented on the interface, such as hands or feet. While in the third-person perspective, the game character may be presented in its entirety on the interactive interface, which reduces the user's control difficulty and dizziness, and more emphasizes the dynamism of the image. The developer may choose the specific way of displaying the game character according to the content of the game, which is not limited in this disclosure.

As shown in FIG. 1, the information processing method may include the following steps.

At step S1, a switching control is provided on the graphical user interface.

At step S2, when it is detected that the crosshair is located on the virtual object, a type of the virtual object is acquired.

At step S3, whether the first virtual tool equipped by the game character matches the type of the virtual object is determined according to the type of the virtual object.

At step S4, if the first virtual tool equipped by the game character does not match the type of the virtual object, a second virtual tool matching the virtual object is acquired according to the type of the virtual object, and the second virtual tool is set as a switching target of the switching control.

At step S5, in response to a first touch operation of the switching control, the first virtual tool equipped by the game character is switched to the second virtual tool.

According to the information processing method in this exemplary embodiment, a switching control may be provided on a graphical user interface; when it is detected that the crosshair is located on the virtual object, the type of the virtual object is acquired; according to the type of the virtual object, it is determined whether the first virtual tool equipped by the game character matches the type of the virtual object; if not, a second virtual tool that matches the virtual object is acquired according to the type of the virtual object, and the second virtual tool is set as a switching target of the switching control; and in response to a touch operation of the switching control, the first virtual tool equipped by the game character is replaced with the second virtual tool. On the one hand, the problem that the configuration bar occupies too much space of controls on GUIs is solved through the integration of controls on GUIs; on the other hand, the player's burden of operation is reduced, so that it is not necessary for the player to perform a series of tedious operation processes, such as selecting collection tools from the configuration bar and equipping collection tools, which further optimizes the player's gaming experience.

Hereinafter, the information processing method in this exemplary embodiment will be further described with reference to FIGS. 3 to 6.

In an exemplary embodiment of the present disclosure, the method includes the following steps.

At step S1, a switching control is provided on the graphical user interface.

At step S2, when it is detected that the crosshair is located on the virtual object, a type of the virtual object is acquired.

At step S3, whether the first virtual tool equipped by the game character matches the type of the virtual object is determined according to the type of the virtual object.

At step S4, if the first virtual tool equipped by the game character does not match the type of the virtual object, a second virtual tool matching the virtual object is acquired according to the type of the virtual object, and the second virtual tool is set as a switching target of the switching control.

At step S5, in response to a first touch operation of the switching control, the first virtual tool equipped by the game character is switched to the second virtual tool.

Figure 3:
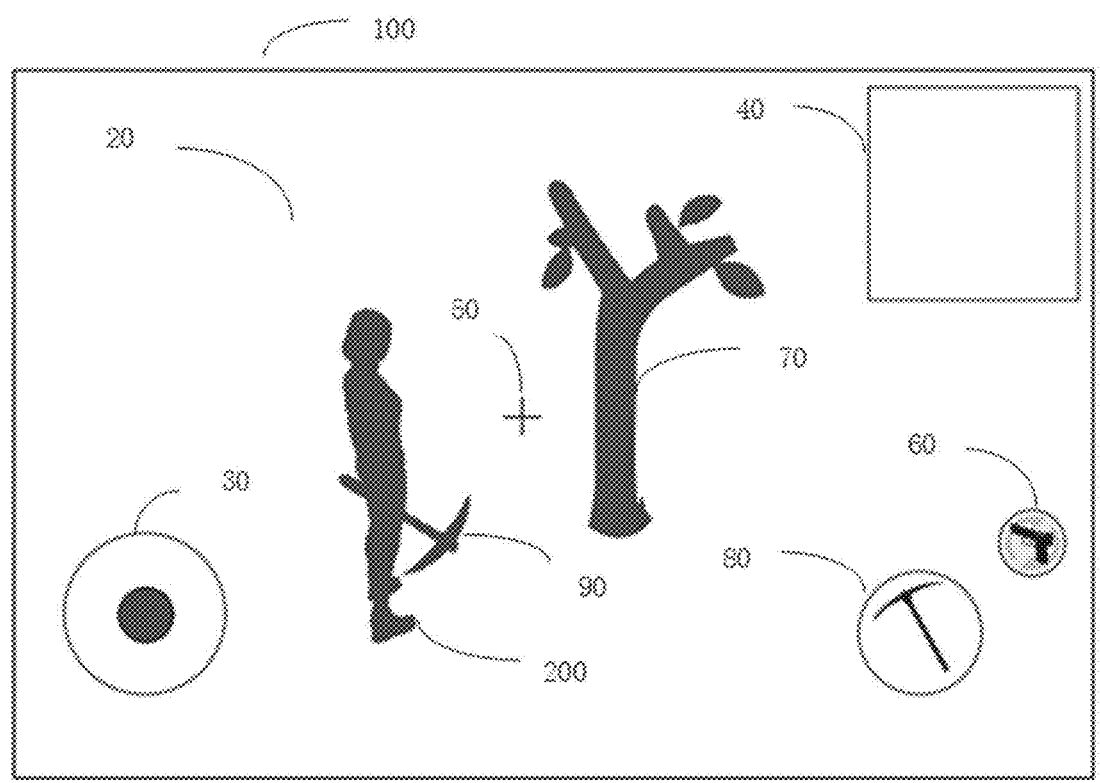
FIG. 3 is a schematic diagram of a graphical user interface in an exemplary embodiment of the present disclosure.

In an exemplary embodiment of the present disclosure, as shown in FIG. 3, the graphical user interface 100 (hereinafter referred to as an interface) at least includes a part of a game scene 20, at least one virtual object 70, a game character 200, a crosshair 50, and an execution control 80. In this embodiment, the game character is a virtual game character controlled by the player, and the virtual object is a game object with which the game character controlled by the player may interact in the game scene. For example, the virtual object may be an NPC (Non-player character) or an enemy character controlled by other game players. In addition, in some survival games, players may collect the natural resources in the game scene to supply the physical strength or equipment of the game character, so the natural resources distributed in the game scene, such as stones, trees, metals, huntable animals, fruits, and vegetables are also belong to the virtual objects described in the embodiments of the present disclosure.

The crosshair on the graphical user interface is used to aim at the virtual object in the game scene. The player may not only control the movement of the game character by the drag operation of the virtual joystick 30 on the graphical user interface as shown in FIG. 3, but also may adjust the field of view of the game character 200 by the slide operation within a preset area (not shown) on the graphical user interface, thereby adjusting the virtual object aimed at by the crosshair 50. The virtual joystick and the preset area may be set to be visible or invisible on the interface, and their specific form and their position on the interface may also be arranged according to the needs of the developer or the player, which is not limited in this embodiment.

Execution controls on the interface are used to control the game character to perform corresponding game operation on the virtual object. For example, when the crosshair is aiming at an enemy in the game scene, the player may trigger the execution controls by a touch operation to attack the enemy via weapons equipped, such as firing or attacking by using tools. Execution controls may be displayed in the form of text or graphics, such as a bullet icon, a tool icon, and the like, which is not limited in this embodiment.

In step S1, a switching control is provided on the graphical user interface.

In this exemplary embodiment, the switching control may be arranged at any position on the graphical user interface. For example, the switching control may be arranged at the upper left of the graphical user interface. For another example, the switching control may also be arranged at the lower right of the graphical user interface, etc., and may be arranged according to the specific need of the developer or the player, which is not particularly limited in this exemplary embodiment. As shown in FIG. 3, the switching control is located on the right side of the interface and below the minimap 40, and is presented in the form of a "gun+arrow" icon.

In step S2, when it is detected that the crosshair is located on the virtual object, a type of the virtual object is acquired.

In this exemplary embodiment, the game player controls the crosshair to aim at a certain virtual object in the game scene by corresponding operations on the graphical user interface, to acquire the type of the virtual object. The virtual object may be distributed at multiple positions of the game scene, so that there may be a plurality of virtual objects in the game scene displayed on the current interface. In this embodiment, the action of acquiring the type of the virtual object is triggered only when the crosshair is focused on a certain virtual object. As mentioned earlier, natural resources include, for example, stones, trees, metals, huntable animals, fruits and vegetables, etc., which are all belong to virtual objects. Therefore, virtual objects may also be divided into different types according to different acquisition methods, such as minerals-type, plants-type and animals-type.

In step S3, according to the type of the virtual object, whether the first virtual tool equipped by the game character matches the type of the virtual object is determined.

In this exemplary embodiment, the first virtual tool currently equipped by the game character is acquired according to the type of the virtual object. The first virtual tool includes, but is not limited to, sickle, axe, firearm, bow-and-arrow, and so on. In survival games, one or two basic virtual tools, such as sickles and axes, may be preset and configured for the game character at the beginning of the game, so as to help the player becomes familiar with the gameplay and integrates into the game atmosphere more quickly. In addition, the virtual tools may also be set to distribute in multiple locations of the game scene, respectively. When the game character controlled by the player reaches this position, the corresponding virtual tools may be acquired. The developer or the player may set them according to specific needs, which is not limited, in the embodiments of this present disclosure. Further, it is determined whether the first virtual tool equipped by the game character matches the type of the virtual object. In the game, the operations on virtual objects need to meet the requirement that types of virtual objects match the virtual tools equipped by the game characters. For example, when collecting the mineral-type virtual objects, virtual tools like pickaxes are required, when collecting the plant-type virtual objects, the matched virtual tool is axe, and when collecting the animal-type virtual objects, the virtual tools like bows-and-arrows or guns are required, so as to collect the virtual resources successfully. The developer may build a variety of mapping relationship between virtual objects and virtual tools based on the type of game or the specific content in the game, which is not limited in the embodiments of this present disclosure. In this case, if virtual tools equipped by the virtual character and virtual objects do not match each other, the corresponding operation is invalid (even if it is triggered) and does not produce any effect in the game after clicking the execution control.

Figure 4:
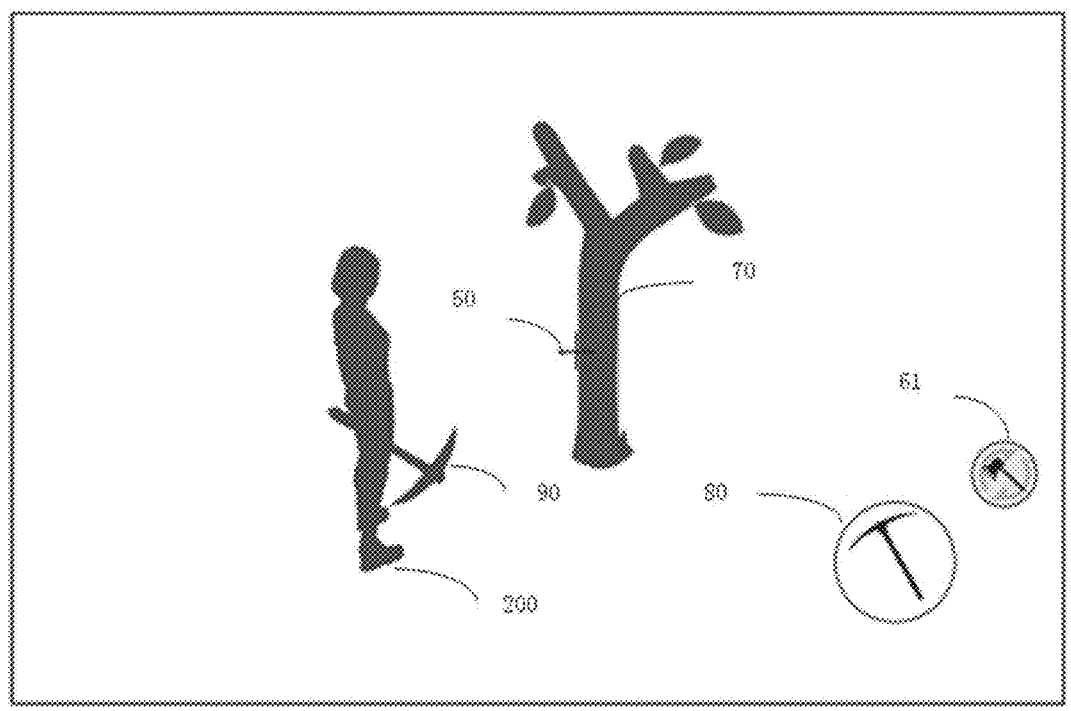
FIG. 4 is a schematic diagram of a graphical user interface in an exemplary embodiment of the present disclosure.

For example, in FIG. 4, the virtual object aimed at by the game character is a tree 70. Optionally, the model outline of the tree 70 may be set to be presented as highlighted, so that the player will notice that the virtual object being aimed at by the crosshair currently. Since the virtual tool that triggers the corresponding felling operation on tree 70 is the axe, if the first virtual tool currently equipped by the game character is sickle 90, it is determined that the first virtual tool does not match the virtual object.

In step S4, if the first virtual tool does not match the virtual object, a second virtual tool matching the virtual object is acquired according to the type of the virtual object, and the second virtual tool is set as a switching target of the switching control.

In the present exemplary embodiment, when it is determined that the first virtual tool does not match the type of the virtual object, a second virtual tool that matches the virtual object is acquired. In the case shown in FIG. 4, the second virtual tool matching the virtual object tree 70 is the axe, and therefore the axe is set as a to-be-switched target of the switching control 60.

Further, as an optional solution, after step S4, the method further includes the following step.

At step S43, the icon of the switching control is controlled to switching from the initial state to displaying the second virtual tool.

As shown in FIG. 3, the original icon of the switching control 60 displayed on the interface is switched from the initial state (gun+arrow) to the axe icon 61, which is corresponding to the second virtual tool 'axe' shown in FIG. 4, in order to clearly provide the player with the visual feedback of the to-be-switched target (i.e., the second virtual tool axe) on the interface, prompting the game character controlled by the player to switch the virtual tool equipped, so that the player may perform subsequent game operations.

Similarly, the movement of the crosshair is controlled by the player, and then the crosshair switches from one virtual object to another virtual object. For example, when the game character is equipped with a firearm, the crosshair first stays on the stone in the scene, and the icon of the switching control switches from the initial state (gun+arrow) to pick-axe icon. At this time, if the crosshair moves quickly to the adjacent trees, the display of the switching control switches from pickaxe icon to axe icon. In this way, the changes of the virtual tools which is required to perform respective to-be-performed operations may be timely fed back to the player, wherein said respective to-be-performed operations correspond to the changes of the virtual object that the game character focuses on.

As an optional solution, controlling the icon of the switching control to switch from the initial state to displaying the second virtual tool further includes step S41, which is before step S43.

At step S41, the display state of the switching control is controlled.

In the exemplary embodiment of the present disclosure, by controlling the display state of the switching control, the switching control may be displayed differently with respect to other controls on the interface, so as to remind the player that the first virtual tool currently equipped by the game character may be replaced with a second virtual tool that matches the aimed virtual object. For example, one can make the icon of the switching control shaking or vibrating, or make a preset animation be played on the icon of the switching control. The specific display mode may be set according to the needs of the developer or the player, which is not limited in this embodiment.

Further, as an optional solution, the display state at least includes one of the following: color, brightness, transparency and size. For example, the switching control may be set to be equipped with a gun by default in the initial state. When the game character focuses on a tree in the game scene, at this point, after determined that the gun equipped does not match the tree, the player has to be prompted to switch the gun to the axe. At this time, the icon (gun+arrow) in the initial state can be controlled to put the display gradually fading into a transparency of 30% and then continue to disappear, and at same time the color of the icon is changed to highlighted red and last for 1 second, then the second virtual tool (i.e. the icon of the axe) is displayed on the switching control. The developer may set the display state by selecting one or more display states from various display states and conducting combination, in order to achieve a stronger visual feedback effect, which is not limited in the embodiments of the present disclosure.

In step S5, in response to a first touch operation of the switching control, the first virtual tool equipped by the game character is switched to the second virtual tool.

In this exemplary embodiment, a player may implement a first touch operation on a switching control, to switch a first virtual tool already equipped by a game character to a second virtual tool. In the exemplary embodiment of the present disclosure, the touch operation may include, but is not limited to, click, long press, pop and other types of interactive operations, and may be set according to the specific habits of the developer or player, which is not limited in embodiment. According to this embodiment, by automatically identifying the virtual object focused on by the crosshair and the virtual tool matching it, and then based on the first touch operation performed by the player on the switching icon (that is, confirming the switch of the virtual tool equipped by the virtual character), the sickle 90 in FIG. 4, which is originally equipped by the game character, is switched to the axe 91 in FIG. 5.

Further, as an optional solution, the method further includes the following step. At step S6, the icon of the execution control is controlled, so as to switch from the first virtual tool to the second virtual tool.

Figure 5:
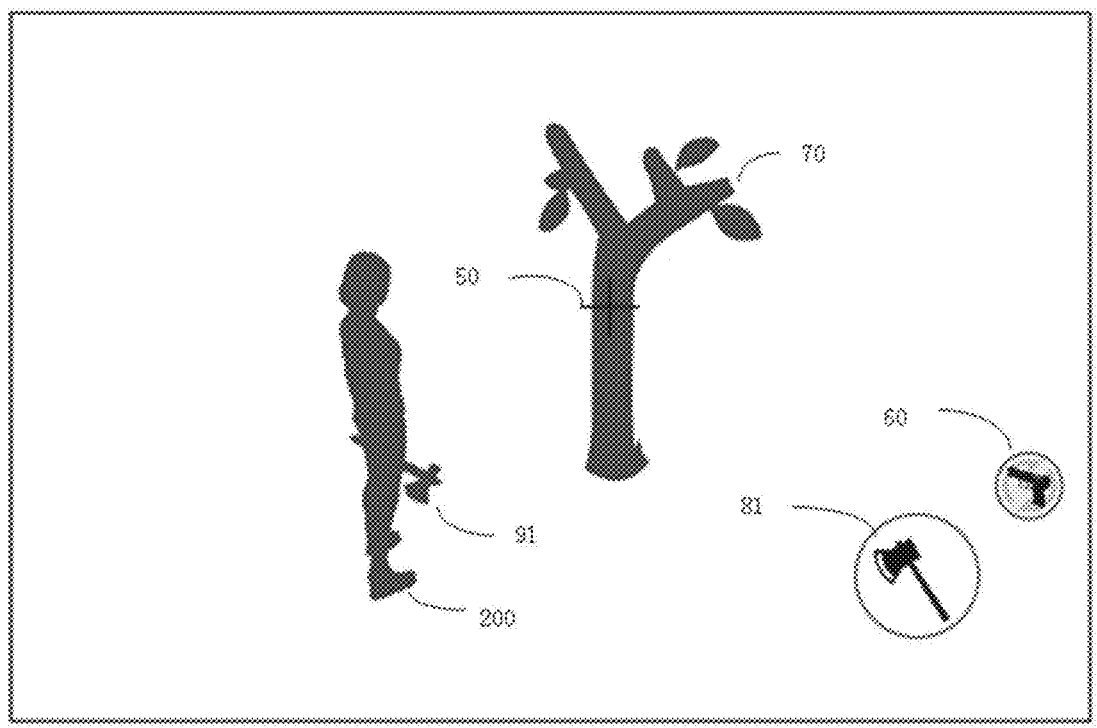
FIG. 5 is a schematic diagram of a graphical user interface in another exemplary embodiment of the present disclosure.

As shown in FIG. 5, the icon of the execution control on the interface is switched from the first virtual tool sickle 80 to the second virtual tool axe 81. This setting allows the player to further determine that the tool currently equipped has been switched to an axe, which indicates that corresponding collection operation can be performed, thereby avoiding invalid operations in the game.

Further, as an optional solution, after the step S6, the method further includes the following step S7. At step S7, the switching control is controlled to switch to an initial state.

After the execution control icon have also been replaced with the second virtual tool corresponding to the to-be-switched target, if the function of visual cue of the switching control is already completed, the switching control is switched to the initial state. Preferably, the display of the switching control may be switched to the initial state within a preset time (for example, 2 seconds) after the icon of the execution control is replaced with the second virtual tool icon. As shown in FIG. 5, the icon of the switching control is switched from the axe 61 (shown in FIG. 4) to the icon 60 (gun+arrow) in the initial state (shown in FIG. 5), that is, the icon of the switching control may be restored from the axe to the default icon 60 (gun+arrow) shown in the initial state, in order to prompt the player that the switching control may perform the default configuration functions.

Further, as an optional solution, the method further includes the following step. At step S8, when it is detected that the crosshair leaves the virtual object, the switching control is controlled to switch to the initial state.

As mentioned earlier, in many game scenes, there are pluralities of virtual objects around the game character controlled by the player. If the crosshair is currently located on a certain virtual object, the switching control displays a prompt of the switchable virtual tools at this point, thereby performing the subsequent interactive operations, but the aimed virtual object may not be the ideal object that the player tries to interact with. For example, when the game character controlled by the player has completed a large number of logging operations and obtained a sufficient amount of wood, subsequent logging operations are meaningless to the game character at this time. The game character may choose to interact with other virtual objects in the scene or continue walking to another scene to get stones (i.e., natural resources) that are relatively insufficient. When it is detected that the crosshair leaves the virtual object that it previously aimed, it may be regarded that the game character does not want to interact with the virtual object that he or she previously aimed at this time and is determining the virtual object that he or she intends to further interact with within the scope of the visible game scene, thus the switching control is switched to the initial state.

Furthermore, as an optional solution, the method further includes the following step. At step S9, in response to a third touch operation on the switching control in the initial state, a plurality of first virtual tools that may be equipped by the game character are acquired, and according to a preset switching rule, the first virtual tool equipped by the game character is controlled to switch among the plurality of the first virtual tools.

In the embodiment of the present disclosure, the function of the switching control itself, that is, the initial state of the switching control may be configured to: in response to a third touch operation on the switching control, acquire a plurality of first virtual tools that may be equipped by the game character, and switch among the plurality of first virtual tools according to the preset switching rule. This function was given to the switching control when it was originally designed, that is, the player may perform the switching among the virtual tools equipped by the game character in the game by touch operations on the switching control.

Specifically, the preset switching rule may be set as follows: when the player clicks the switching control, the first virtual tool equipped by the game character last time can be acquired, thereby the virtual tool currently equipped may be replaced with the virtual tool equipped last time. For example, if the virtual tool currently equipped by the game character is a sickle and the virtual tool equipped last time is a pistol, then after the player clicks the switching control, the tool equipped by the game character switches from the sickle to the pistol. If the player clicks the switching control again, the virtual tool equipped by the game character will switches from a pistol to a sickle again. The switching control automatically remembers the virtual tool equipped last time and switches the virtual tool currently equipped by the game character to the virtual tool equipped last time. This setting is consistent with the player's cognition and facilitates the player's game operations. In addition, the preset switching rule may be configured to switch a plurality of first virtual tools that may be equipped by the game character according to a preset order. For example, assuming that there are totally five first virtual tools (sickle, axe, pistol, stick, and bow-and-arrow) in the backpack of the game character that may be currently equipped. The virtual tool currently equipped by the game character is a sickle, if the preset switching order is stick-bow-and-arrow-pistol-axe-sickle, then in response to the player clicking the switching control, the virtual tool equipped by the game character switches from stick to bow-and-arrow. If the player clicks the switching control again, then switches from bow-and-arrow to pistol, and so on. The preset order may be set according to the order of a plurality of virtual tools acquired by the game character in the game, or may be set according to the switching rule of the preset order of different types of tools. The preset rule and the preset order in this embodiment are both set according to the specific needs of the developer or the player, which is not limited in this embodiment.

As an optional solution, the method further includes the following step S10. At S10, in response to the second touch operation on the switching control in the initial state, a third virtual tool equipped by the game character last time is acquired, and the second virtual tool equipped by the game character is replaced with the third virtual tool; wherein the type of the second virtual tool is different from that of the third virtual tool.

In this embodiment, because the situation in the game is changing rapidly, the content of the game scene faced by the game character is also constantly changing, especially in survival games. When the game character is performing a collection operation, the enemy or the beast may suddenly come into his or her sight, at this time, the game character needs to quickly switch from the collection operation to the combat operation, that is, the tool equipped by the game character needs to be switched from the collection tool (sickle, axe) to the combat weapon (such as a firearm). In this embodiment, the player may acquire the third virtual tool equipped by the game character last time by the second touch operation acting on the switching control, and replace the second virtual tool equipped by the game character with the third virtual tool; wherein the type of the second virtual tool is different from that of the third virtual tool. For example, the second virtual tool currently equipped by the game character is a sickle, and the third virtual tool equipped last time is a pistol, then the equipment of the game character may be switched from a sickle to a pistol at this time, so that the game character may quickly enter the combat state and get enough game time, thereby improving the player's experience. Similarly, when the combat status ends, the player may switch the second virtual tool (i.e. pistol) of the equipment to the third virtual tool (i.e. sickle) equipped last time by clicking the switching control, so as to continue the unfinished collection operation just now in the scene.

Further, as an optional solution, the method further includes the following step S11. At step S11, in response to a fourth touch operation on the execution control, the game character is controlled to perform a corresponding game operation on the virtual object.

Figure 6:
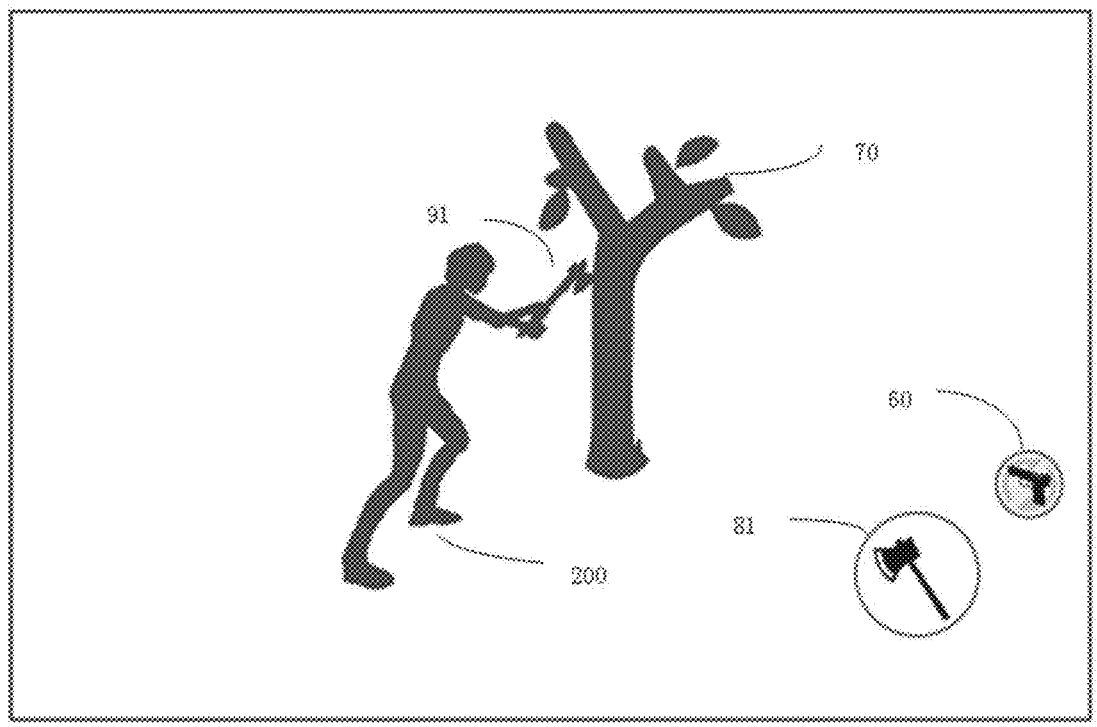
FIG. 6 is a schematic diagram of a graphical user interface in another exemplary embodiment of the present disclosure.

After completing the switching of the virtual tool equipped by the game character, the player triggers the game character to perform a game operation on the virtual object by the fourth touch operation on the execution control 81. That is, as shown in FIG. 6, the game character 200 performs the slashing action on the virtual object tree 70 by using the virtual tool axe 91 equipped, so as to acquire tree resources and store the acquired wood in a backpack for subsequent game operations, such as construction or repair of a house. When the virtual tool equipped by the game character is a firearm, if the execution control is clicked, then the game character is triggered to shoot at the virtual object aimed by the crosshair.

In conclusion, according to the information processing method in this exemplary embodiment, a switching control may be provided on a graphical user interface; when it is detected that the crosshair is located on the virtual object, the type of the virtual object is acquired; according to the type of the virtual object, it is determined whether the first virtual tool equipped by the game character matches the type of the virtual object; if the first virtual tool equipped by the game character does not match the type of the virtual object, a second virtual tool that matches the virtual object is acquired according to the type of the virtual object, and the second virtual tool is set as a switching target of the switching control; and in response to a touch operation of the switching control, the first virtual tool equipped by the game character is replaced with the second virtual tool. On the one hand, the problem that the configuration bar occupies too many controls on GUIs is solved through the integration of controls on GUIs, the more rich visual cue function is provided to the switching control; on the other hand, the player's operation burden is reduced, so that it is not necessary for the player to perform a series of tedious operation processes, such as selecting collection tools from the configuration bar and equipping the collection tools, which further optimizes the player's gaming experience. In addition, by further setting the display transformations of the switching control and the execution control in different states, the player is provided with better visual feedback of tool switching and execution operations in respective scenes, thereby more comprehensively improving interactive experience in the game.

In the information processing method in this exemplary embodiment, a switching control may be provided on a graphical user interface; when it is detected that the crosshair is located on the virtual object, the type of the virtual object is acquired; according to the type of the virtual object, it is determined whether the first virtual tool equipped by the game character matches the type of the virtual object; if not, a second virtual tool that matches the virtual object is acquired according to the type of the virtual object, and the second virtual tool is set as a switching target of the switching control; and in response to a touch operation of the switching control, the first virtual tool equipped by the game character is replaced with the second virtual tool. On the one hand, the problem that the configuration bar occupies too many controls on GUIs is solved through the integration of controls on GUIs; on the other hand, the player's operation burden is reduced, so that it is not necessary for the player to perform a series of tedious operation processes, such as selecting collection tools from the configuration bar and equipping the collection tools, which further optimizes the player's gaming experience.

It should be noted that, although various steps of the methods in the present disclosure are described in a specific order in the accompanying drawings, this is not required or implied that the steps must be performed in this specific order, or a desired result may be realized must by performing all the steps shown. Additionally or alternatively, certain steps may be omitted, a plurality of steps may be combined into one step to execute, and/or one step may be decomposed into a plurality of steps to execute, and the like.

Figure 7:
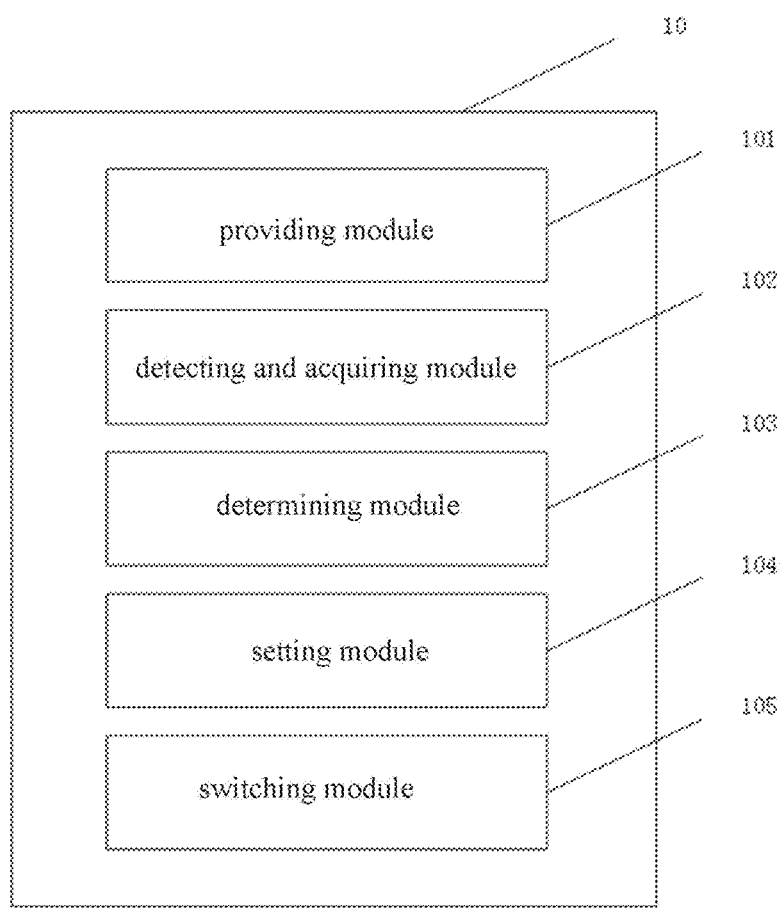
FIG. 7 is a block diagram of an information processing apparatus in the present disclosure.

According to an exemplary embodiment of the present disclosure, an information processing apparatus is provided, which is applied on a game application executed on a mobile terminal, by rendering and generating a graphical user interface on the touch-control screen of the mobile terminal. The graphical user interface at least includes a part of a game scene, at least one virtual object, a game character, a crosshair, and an execution control, and the crosshair is used to aim at the virtual object in the game scene, and the execution control is used to control the game character to perform corresponding game operation on the virtual object. As shown in FIG. 7, the information processing apparatus 10 may include a providing module 101, a detecting and acquiring module 102, a determining module 103, a setting module 104 and a switching module 105.

The providing module 101 is configured to provide a switching control on the graphical user interface. The detecting and acquiring module 102 is configured to acquire the type of the virtual object, when it is detected that the crosshair is located on the virtual object. The determining module 103 is configured to determine whether the first virtual tool equipped by the game character matches the type of the virtual object, according to the type of the virtual object. The setting module 104 is configured to acquire a second virtual tool matching the virtual object according to the type of the virtual object and set the second virtual tool as a to-be-switched target of the switching control, when the first virtual tool equipped by the game character does not match the type of the virtual object. The switching module 105 is configured to switch the first virtual tool equipped by the game character to the second virtual tool, in response to a first touch operation of the switching control.

The specific details of respective information processing device modules mentioned above have been described in detail in the corresponding information processing method, so it will not be repeated here.

It should be noticed that, although several circuits or units of devices for execution are mentioned in the detailed description above, such division is not mandatory. Indeed, according to embodiments of the present disclosure, the features and functions of two or more modules or units described above may be embodied in one circuit or unit. Conversely, the features and functions of one of the modules or units described above may be further divided into a plurality of modules or units to embody.

In an exemplary embodiment of the present disclosure, there is provided an electronic device capable of implementing the above method.

Those skilled in the art may understand that various aspects of the present disclosure may be implemented as a system, method, or program product. Therefore, various aspects of the present disclosure may be embodied in the following forms, i.e. a complete hardware implementation, a complete software implementation (including firmware, microcode, etc.), or a combination of hardware and software, which may be collectively referred to herein "circuit," "module," or "system".

The electronic device 600 according to this embodiment of the present disclosure is described below with reference to FIG. 8. The electronic device 600 shown in FIG. 8 is merely an example, and should not impose any limitation on the functions and scope of use of the embodiment of the present disclosure.

Figure 8:
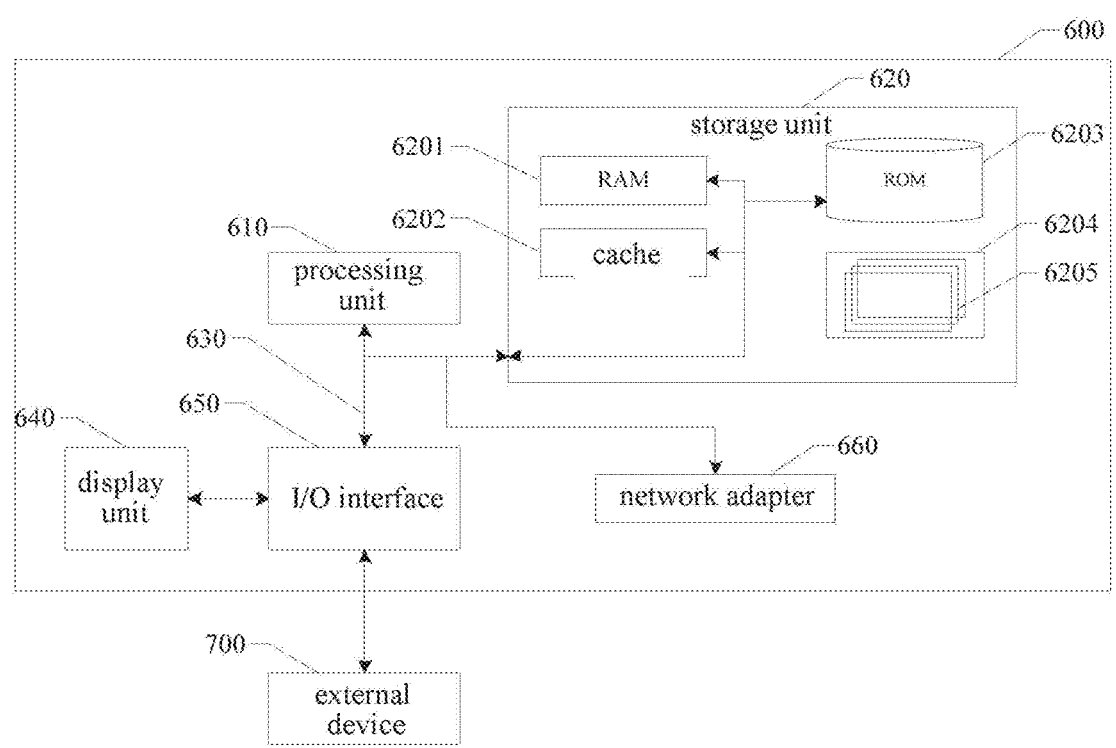
FIG. 8 is a schematic module diagram of the electronic device in an exemplary embodiment of the present disclosure.

As shown in FIG. 8, the electronic device 600 is expressed in the form of a general-purpose computing device. The components of the electronic device 600 may include, but are not limited to, at least one processing unit 610, at least one storage unit 620, a bus 630 connecting different system components (including the storage unit 620 and the processing unit 610) and a display unit 640.

The storage unit stores program code, and the program code may be executed by the processing unit 610, so that the processing unit 610 executes various steps of the exemplary embodiments according to the present disclosure described in the above-mentioned "exemplary method" in the specification.

The storage unit 620 may include a readable medium in the form of a volatile storage unit, such as a random access storage unit (RAM) 6201 and/or a cache storage unit 6202, and may further include a read-only storage unit (ROM) 6203.

The storage unit 620 may further include a program/utility tool 6204 having a set of (at least one) program modules 6205. Such program modules 6205 include, but are not limited to, an operating system, one or more application programs, other program modules, and program data. Each or some combination of these examples may include an implementation of a network environment.

The bus 630 may be one or more of several types of bus structures, comprising a storage unit bus or a storage unit controller, a peripheral bus, a graphics acceleration port, a processing unit, or a local bus that uses any of the bus structures in a variety of bus structures.

The electronic device 600 may also communicate with one or more external devices 700 (such as a keyboard, pointing device, blue tooth device, etc.), may also communicate with one or more devices that enable a user to interact with the electronic device 600, and/or with any device (e.g., router, modem, etc.) that enables the electronic device 600 to communicate with one or more other computing devices. This communication may be performed through an input/output (I/O) interface 650. Moreover, the electronic device 600 may also communicate with one or more networks (such as a local area network (LAN), a wide area network (WAN), and/or a public network, such as the Internet) through the network adapter 660. As shown, the network adapter 660 communicates with other modules of the electronic device 600 through the bus 630. It should be understood that although not shown in the figure, other hardware and/or software modules may be used in conjunction with the electronic device 600, comprising but not limited to: microcode, device drivers, redundant processing units, external disk drive arrays, RAID systems, tape drives and data backup storage systems, and so on.

Through the description of the above embodiments, those skilled in the art will readily understand that the exemplary embodiments described here may be implemented by software or by software in combination with necessary hardware. Therefore, the technical solution according to the embodiments of the present disclosure may be embodied in a form of software product, which may be stored in a non-volatile storage medium (which may be a CD-ROM, a USB flash drive, a mobile hard disk, etc.) or on a network, including a number of instructions to make a computing device (which may be a personal computer, a server, a terminal apparatus, or a network device, etc.) to perform the methods according to embodiments in the present disclosure.

In an exemplary embodiment of the present disclosure, there is also provided a computer-readable storage medium on which a program product capable of implementing the above-mentioned method of the present specification is stored. In some possible implementation manners, aspects of the present disclosure may also be implemented in the form of a program product, which includes program code. When the program product runs on a terminal device, the program code is used to make the terminal device perform the steps according to various exemplary embodiments of the present disclosure described in the above-mentioned "exemplary method" section of this specification.

Figure 9:
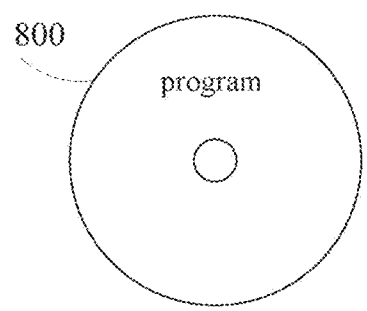
FIG. 9 is a schematic diagram of a program product in an exemplary embodiment of the present disclosure.

Referring to FIG. 9, a program product 800 for implementing the above method according to an embodiment of the present disclosure is described. The program product 800 can use a portable compact disc read-only memory (CD-ROM) and include the program code, which may run on a terminal device, for example, a personal computer. However, the program product of the present disclosure is not limited thereto. In this document, the readable storage medium may be any tangible medium containing or storing a program, and the program may be used by or in combination with an instruction execution system, apparatus, or device.

The program product may employ any combination of one or more readable media. The readable medium may be a readable signal medium or a readable storage medium. The readable storage medium may be, for example, but is not limited to, an electronic, magnetic, optical, electromagnetic, infrared, or semiconductor system, apparatus, or device, or any combination thereof. More specific examples (non-exhaustive list) of readable storage media include: electrical connection with one or more wires, portable disk, hard disk, random access memory (RAM), read-only memory (ROM), erasable programmable read-only memory (EPROM or flash memory), optical fiber, portable compact disc read-only memory (CD-ROM), optical storage device, magnetic storage device, or any suitable combination of the foregoing.

The computer-readable signal medium may include a data signal in baseband or propagated as a part of a carrier wave, which carries readable program code. Such a propagated data signal may take many forms, comprising but not limited to electromagnetic signals, optical signals, or any suitable combination of the foregoing. The readable signal medium may also be any readable medium other than a readable storage medium, and the readable medium may send, propagate, or transmit a program for use by or in combination with an instruction execution system, apparatus, or device.

The program code contained on the readable medium may be transmitted using any appropriate medium, comprising but not limited to wireless, wired, optical fiber cable, RF, etc., or any suitable combination of the foregoing.

The program code for performing the operations of the present disclosure may be written in any combination of one or more program design languages, which include object-oriented program design languages, such as Java, C.++, etc. and further include conventional procedural program design language, such as "C" or a similar program design language. The program code may be executed entirely or partly on the user computing device, may be executed as an independent software package, may be executed partly on the user computing device and partly on the remote computing device, or may be executed entirely on the remote computing device or server. In the case of a remote computing device, the remote computing device may be connected to the user computing device via any kind of network, such as a local area network (LAN) or a wide area network (WAN), or it may be connected to external computing devices, for example, connected to external computing devices via the Internet by use of an Internet service provider.

In addition, the above-mentioned drawings are merely a schematic description of processes included in methods according to the exemplary embodiments of the present disclosure, and are not limiting purposes. It is easy to understand that the processes shown in the above drawings does not indicate or limit the chronological order of these processes. In addition, it is also easy to understand that these processes may be performed synchronously or asynchronously in multiple modules, for example.

Other embodiments of the present disclosure will be apparent to those skilled in the art after consideration of the specification and practice of the present disclosure disclosed here. The present application is intended to cover any variations, uses, or adaptive changes of the present disclosure, which are in accordance with the general principles of the disclosure and include common general knowledge or common technical means in the art that are not disclosed in the present disclosure. The specification and embodiments are deemed to be exemplary only and the true scope and spirit of this disclosure is indicated by the claims.

It should be understood that this disclosure is not limited to the exact structure described above and shown in the accompanying drawings, and may be subject to various modifications and changes without deviating from its scope. The scope of the disclosure is to be limited only by the appended claims.

What is claimed is:

1. An information processing method, which is applied on a game application executed on a mobile terminal, by rendering and generating a graphical user interface on a touch-control screen of the mobile terminal; wherein, the graphical user interface at least comprises a part of a game scene, at least one virtual object, a game character, a crosshair, and an execution control, the crosshair is used to aim at the virtual object in the game scene, and the execution control is used to control the game character to perform corresponding game operation on the virtual object, the method comprises:

providing a switching control on the graphical user interface;

acquiring a type of the virtual object, when detecting that the crosshair is located on the virtual object;

determining whether a first virtual tool equipped by the game character matches the type of the virtual object, according to the type of the virtual object;

if a first virtual tool equipped by the game character does not match the type of the virtual object, acquiring a second virtual tool matching the virtual object according to the type of the virtual object, and setting the second virtual tool as a to-be-switched target of the switching control; and switching the first virtual tool equipped by the game character to the second virtual tool, in response to a first touch operation of the switching control.

2. The method according to claim 1, wherein after the step of setting the second virtual tool as a to-be-switched target of the switching control, the method further comprises:

controlling the icon of the switching control to switch from the initial state to displaying the second virtual tool.

3. The method according to claim 2, wherein before the step of controlling the icon of the switching control to switch from the initial state to displaying the second virtual tool, the method further comprises:

controlling a display state of the switching control.

4. The method according to claim 3, wherein, the display state comprises at least one of:

color, brightness, transparency and size.

5. The method according to claim 1, wherein the method further comprises:

controlling the icon of the execution control to switch from the first virtual tool to the second virtual tool.

6. The method according to claim 5, wherein after the step of controlling the icon of the execution control to switch from the first virtual tool to the second virtual tool, the method further comprises:

controlling the switching control to switch to an initial state.

7. The method according to claim 6, wherein the method further comprises:

in response to a third touch operation on the switching control in the initial state, acquiring a plurality of first virtual tools that may be equipped by the game character, and according to a preset switching rule, controlling the first virtual tool equipped by the game character to switch among the plurality of first virtual tools.

8. The method according to claim 6, wherein the method further comprises:

in response to a second touch operation on the switching control in the initial state, acquiring a third virtual tool equipped by the game character last time, and replacing the second virtual tool equipped by the game character with the third virtual tool;

wherein, the type of the second virtual tool is different from that of the third virtual tool.

9. The method according to claim 1, wherein the method further comprises:

controlling the switching control to switch to the initial state, when it is detected detecting that the crosshair leaves the virtual object.

10. The method according to claim 1, wherein the method further comprises:

in response to a fourth touch operation on the execution control, controlling the game character to perform corresponding game operation on the virtual object.

11. A non-transitory computer-readable storage medium having a computer program stored thereon, wherein, when is executed by a processor, the computer program causes the processor to implement an information processing method, wherein the information processing method is applied on a game application executed on a mobile terminal, by rendering and generating a graphical user interface on a touch-control screen of the mobile terminal; wherein the graphical user interface at least comprises a part of a game scene, at least one virtual object, a game character, a crosshair, and an execution control, the crosshair is used to aim at the virtual object in the game scene, and the execution control is used to control the game character to perform corresponding game operation on the virtual object, the method comprises:

providing a switching control on the graphical user interface;

acquiring a type of the virtual object, when detecting that the crosshair is located on the virtual object;

determining whether a first virtual tool equipped by the game character matches the type of the virtual object, according to the type of the virtual object;

if a first virtual tool equipped by the game character does not match the type of the virtual object, acquiring a second virtual tool matching the virtual object according to the type of the virtual object, and setting the second virtual tool as a to-be-switched target of the switching control; and switching the first virtual tool equipped by the game character to the second virtual tool, in response to a first touch operation of the switching control.

12. An electronic device, comprising:

a processor; and a memory for storing executable instructions of the processor;

wherein, the processor is configured to perform an information processing method by executing the executable instructions, wherein the information processing method is applied on a game application executed on a mobile terminal, by rendering and generating a graphical user interface on a touch-control screen of the mobile terminal; wherein the graphical user interface at least comprises a part of a game scene, at least one virtual object, a game character, a crosshair, and an execution control, the crosshair is used to aim at the virtual object in the game scene, and the execution control is used to control the game character to perform corresponding game operation on the virtual object, the processor is configured to:

provide a switching control on the graphical user interface;

acquire a type of the virtual object, when detecting that the crosshair is located on the virtual object;

determine whether a first virtual tool equipped by the game character matches the type of the virtual object, according to the type of the virtual object;

if a first virtual tool equipped by the game character does not match the type of the virtual object, acquire a second virtual tool matching the virtual object according to the type of the virtual object, and set the second virtual tool as a to-be-switched target of the switching control; and switch the first virtual tool equipped by the game character to the second virtual tool, in response to a first touch operation of the switching control.

13. The electronic device according to claim 12, wherein the processor is further configured to:

after setting the second virtual tool as a to-be-switched target of the switching control, control the icon of the switching control to switch from the initial state to displaying the second virtual tool.

14. The electronic device according to claim 13, wherein the processor is further to configured to:

before controlling the icon of the switching control to switch from the initial state to displaying the second virtual tool, control a display state of the switching control.

15. The electronic device according to claim 12, wherein the processor is further to configured to control the icon of the execution control to switch from the first virtual tool to the second virtual tool.

16. The electronic device according to claim 15, wherein the processor is further to configured to:

after controlling the icon of the execution control to switch from the first virtual tool to the second virtual tool, control the switching control to switch to an initial state.

17. The electronic device according to claim 16, wherein the processor is further to configured to:

in response to a third touch operation on the switching control in the initial state, acquire a plurality of first virtual tools that may be equipped by the game character, and according to a preset switching rule, control the first virtual tool equipped by the game character to switch among the plurality of the first virtual tools.

18. The electronic device according to claim 16, wherein the processor is further to configured to:

in response to a second touch operation on the switching control in the initial state, acquire a third virtual tool equipped by the game character last time, and replace the second virtual tool equipped by the game character with the third virtual tool;

wherein, the type of the second virtual tool is different from that of the third virtual tool.

19. The electronic device according to claim 12, wherein the processor is further to configured to control the switching control to switch to the initial state, when detecting that the crosshair leaves the virtual object.

20. The electronic device according to claim 12, wherein the processor is further to configured to:

in response to a fourth touch operation on the execution control, control the game character to perform corresponding game operation on the virtual object.

* * * * *